US012298018B2

(12) United States Patent
Reichl et al.

(10) Patent No.: US 12,298,018 B2
(45) Date of Patent: May 13, 2025

(54) AUTOMATED CLOUD HOSTED BMS ARCHIVE AND DIFFERENCE ENGINE

(71) Applicant: Johnson Controls Tyco IP Holdings LLP, Milwaukee, WI (US)

(72) Inventors: Gregory T. Reichl, Kaukana, WI (US); Feng Wang, Milwaukee, WI (US); Daniel J. Sonnemann, Waukesha, WI (US); Craig A. Lind, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 13 days.

(21) Appl. No.: 17/575,944

(22) Filed: Jan. 14, 2022

(65) Prior Publication Data

US 2023/0228436 A1    Jul. 20, 2023

(51) Int. Cl.
*F24F 11/46*      (2018.01)
*F24F 11/49*      (2018.01)

(52) U.S. Cl.
CPC .............. *F24F 11/46* (2018.01); *F24F 11/49* (2018.01)

(58) Field of Classification Search
None
See application file for complete search history.

(56) References Cited

U.S. PATENT DOCUMENTS

| 7,523,097 | B1* | 4/2009 | Wilson | G06F 11/1469 |
| 2017/0212487 | A1* | 7/2017 | Gupta | F24F 11/62 |
| 2018/0224814 | A1* | 8/2018 | Elbsat | G06Q 30/0283 |
| 2019/0107830 | A1* | 4/2019 | Duraisingh | G05B 23/0264 |
| 2019/0278665 | A1* | 9/2019 | Raghuram | H04L 67/52 |
| 2020/0226031 | A1* | 7/2020 | Lau | G06F 16/901 |

* cited by examiner

*Primary Examiner* — Kamini S Shah
*Assistant Examiner* — Istiaque Ahmed
(74) *Attorney, Agent, or Firm* — Foley & Lardner LLP

(57) ABSTRACT

A method for determining updates in a building management system (BMS) is shown. The method includes receiving, via an on premise server, configuration data associated with at least part of the BMS. The method includes storing the configuration data within a cloud server communicably coupled with the on premise server. The method includes determining, via a difference engine within the cloud server, information comprising a delta between the configuration data and one or more previous sets of configuration data stored within the cloud server. The method includes providing, to the on premise server, the information to an interface.

15 Claims, 9 Drawing Sheets

Cloud Hosted Server User Interface

| BAS Backup: June 3rd, 2021 | View | Equipment List | Spaces List | Extension List |
| BAS Backup: May 3rd, 2021 | View | Equipment List | Spaces List | Extension List |
| BAS Backup: April 3rd, 2021 | View | Equipment List | Spaces List | Extension List |
| BAS Backup: Initial March 21, 2021 | View | Equipment List | Spaces List | Extension List |

Select Backup to Restore

| Restore | BAS Backup June 3rd, 2021 | 2 Boilers<br>2 Chillers<br>3 Air Handlers | 144 VAV Boxes<br>8 Exhaust Fans<br>4 Cabinet Unit Heaters | 4 VAV Boxes | 10,334 Objects | 5 New Trends<br>10 New Alarms<br>2 Text Alerts |
| Restore | BAS Backup May 3rd, 2021 | 2 Boilers<br>2 Chillers<br>3 Air Handlers | 140 VAV Boxes<br>8 Exhaust Fans<br>4 Cabinet Unit Heaters | | 10,270 Objects | |
| Restore | BAS Backup April 3rd, 2021 | 2 Boilers<br>2 Chillers<br>3 Air Handlers | 140 VAV Boxes<br>8 Exhaust Fans<br>4 Cabinet Unit Heaters | | 10,270 Objects | |
| Restore | BAS Backup Initial March 21, 2021 | 2 Boilers<br>2 Chillers<br>3 Air Handlers | 140 VAV Boxes<br>8 Exhaust Fans<br>4 Cabinet Unit Heaters | | 10,253 Objects | |

| Notifications Sent | |
|---|---|
| Emails | Text Messages |
| Sent: June 3rd, 2021, 6:14:45 PM CDT 4 New VAV Boxes | Sent: June 3rd, 2021, 6:14:45 PM CDT 4 New VAV Boxes |
| Sent: June 3rd, 2021, 5:53:23 PM CDT Backup Successful | |
| Sent: April 3rd, 2021, 6:03:26 PM CDT 5 New Trends, 10 New Alarms, 2 Text Alerts | Sent: April 3rd, 2021, 6:03:26 PM CDT 5 New Trends, 10 New Alarms, 2 Text Alerts |
| Sent: April 3rd, 2021, 5:53:23 PM CDT Backup Successful | |
| Sent: March 21st, 2021, 5:53:23 PM CDT Backup Successful | |

AUTOMATED CLOUD HOSTED BMS ARCHIVE AND DIFFERENCE ENGINE

BACKGROUND

The present disclosure relates generally to building management systems (BMS). More specifically, the present disclosure relates to storage and analytics within a BMS cloud server.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for determining updates in a building management system (BMS). The method includes receiving, via an on premise server, configuration data associated with at least part of the BMS. The method includes storing the configuration data within a cloud server communicably coupled with the on premise server. The method includes determining, via a difference engine within the cloud server, information comprising a delta between the configuration data and one or more previous sets of configuration data stored within the cloud server. The method includes providing, to the on premise server, the information to an interface.

In some embodiments, determining the information comprising the delta includes determining, based on the configuration data, one or more equipment that have been added to the BMS, and determining an increase in energy costs resulting from the one or more equipment being added to the BMS, wherein the information comprises the energy costs.

In some embodiments, the method further includes receiving, via the interface, instructions to restore the BMS to a previous implementation, the previous implementation based on old configuration data of the BMS and providing control signals to the BMS such that the BMS operates in accordance with the old configuration data of the BMS.

In some embodiments, determining the information comprising the delta includes categorizing the configuration data such that the configuration data is categorized at least partially into at least one of a list of equipment within the BMS or a list of spaces within the BMS or a list of extensions associated with the equipment in the BMS, and providing the at least one of the list of equipment within the BMS or the list of spaces within the BMS or the list of extensions associated with the equipment in the BMS to the interface, in response to a request received via the interface.

In some embodiments, storing the configuration data within the cloud server communicably coupled with the on premise server includes storing a plurality of configuration data sets representing operation of the BMS at different time periods, wherein the plurality of configuration data sets comprise the configuration data and the one or more previous sets of configuration data, and provide the plurality of configuration data sets to the interface such that the interface displays the plurality of configuration data sets in sequential order.

In some embodiments, determining the information comprising the delta includes determining, based on the configuration data, one or more objects that have been added to the BMS, wherein the information comprises an updated number of objects within the BMS.

In some embodiments, providing, to the on premise server, the information to the interface includes providing at least one of an email or a text message indicative of the delta between the configuration data and one or more previous sets of configuration data to the interface, in response to a request received via the interface.

Another implementation of the present disclosure is one or more computer readable media (CRM) for determining updates in a building management system (BMS), the one or more CRM including one or more processors configured to perform operations. The operations include receiving, via an on premise server, configuration data associated with at least part of the BMS, storing the configuration data within a cloud server communicably coupled with the on premise server, determining, via a difference engine within the cloud server, information comprising a delta between the configuration data and one or more previous sets of configuration data stored within the cloud server, and providing, to the on premise server, the information to an interface.

In some embodiments, determining the information comprising the delta includes determining, based on the configuration data, one or more equipment that have been added to the BMS, and determining an increase in energy costs resulting from the one or more equipment being added to the BMS, wherein the information comprises the energy costs.

In some embodiments, the processing circuit is further configured to receive, via the interface, instructions to restore the BMS to a previous implementation, the previous implementation based on old configuration data of the BMS and providing control signals to the BMS such that the BMS operates in accordance with the old configuration data of the BMS.

In some embodiments, determining the information comprising the delta includes categorizing the configuration data such that the configuration data is categorized at least partially into at least one of a list of equipment within the BMS or a list of spaces within the BMS or a list of extensions associated with the equipment in the BMS, and providing the at least one of the list of equipment within the BMS or the list of spaces within the BMS or the list of extensions associated with the equipment in the BMS to the interface, in response to a request received via the interface.

In some embodiments, storing the configuration data within the cloud server communicably coupled with the on premise server includes storing a plurality of configuration data sets representing operation of the BMS at different time periods, wherein the plurality of configuration data sets comprise the configuration data and the one or more previous sets of configuration data, and provide the plurality of configuration data sets to the interface such that the interface displays the plurality of configuration data sets in sequential order.

In some embodiments, determining the information comprising the delta includes determining, based on the configuration data, one or more objects that have been added to the BMS, wherein the information comprises an updated number of objects within the BMS.

In some embodiments, providing, to the on premise server, the information to the interface includes providing at least one of an email or a text message indicative of the delta between the configuration data and one or more previous sets of configuration data to the interface, in response to a request received via the interface.

Another implementation of the present disclosure is a building platform for determining updates in a building management system (BMS) of the building. The building platform includes a processing device including a processing circuit configured to receive, via an on premise server, configuration data associated with at least part of the BMS, store the configuration data within a cloud server communicably coupled with the on premise server, determine, via a difference engine within the cloud server, information comprising a delta between the configuration data and one or more previous sets of configuration data stored within the cloud server, provide, to the on premise server, the information to an interface, provide, via the interface, instructions to restore the BMS to a previous implementation, the previous implementation based on old configuration data of the BMS, and provide control signals to the BMS such that the BMS operates in accordance with the old configuration data of the BMS.

In some embodiments, determining the information comprising the delta includes determining, based on the configuration data, one or more equipment that have been added to the BMS, and determining an increase in energy costs resulting from the one or more equipment being added to the BMS, wherein the information comprises the energy costs.

In some embodiments, determining the information comprising the delta includes categorizing the configuration data such that the configuration data is categorized at least partially into at least one of a list of equipment within the BMS or a list of spaces within the BMS or a list of extensions associated with the equipment in the BMS, and providing the at least one of the list of equipment within the BMS or the list of spaces within the BMS or the list of extensions associated with the equipment in the BMS to the interface, in response to a request received via the interface.

In some embodiments, storing the configuration data within the cloud server communicably coupled with the on premise server includes storing a plurality of configuration data sets representing operation of the BMS at different time periods, wherein the plurality of configuration data sets comprise the configuration data and the one or more previous sets of configuration data, and provide the plurality of configuration data sets to the interface such that the interface displays the plurality of configuration data sets in sequential order.

In some embodiments, determining the information comprising the delta includes determining, based on the configuration data, one or more objects that have been added to the BMS, wherein the information comprises an updated number of objects within the BMS.

In some embodiments, providing, to the on premise server, the information to the interface includes providing at least one of an email or a text message indicative of the delta between the configuration data and one or more previous sets of configuration data to the interface, in response to a request received via the interface.

BRIEF DESCRIPTION OF THE DRAWINGS

FIG. 7A is a diagram of an interface, which may be populated with data from the cloud server of FIG. 6, according to some embodiments.

FIG. 7B is a diagram of an interface, which may be populated with data from the cloud server of FIG. 6, according to some embodiments.

DETAILED DESCRIPTION

Overview

Referring generally to the FIGURES, systems and methods for determining changes in building management systems using a difference engine off-premise, based on multiple backups of BMS data (e.g., uploaded every month, uploaded every week, etc.). The difference engine may compare the new BMS data with previous sets of received BMS data to determine "deltas" (e.g., differences between the data sets), such as equipment changes, relationship changes (e.g., between entities defined under a communications protocol), object quantity changes (e.g., number of BACnet objects defined within the BMS), or any combination thereof. The difference engine, or a processing device hosting the difference engine, may then provide updates, recommendations, changes, and other information to an interface (e.g., a workstation within the building, etc.) for further analysis.

Building Management System and HVAC System

HVAC System

Figure 1:
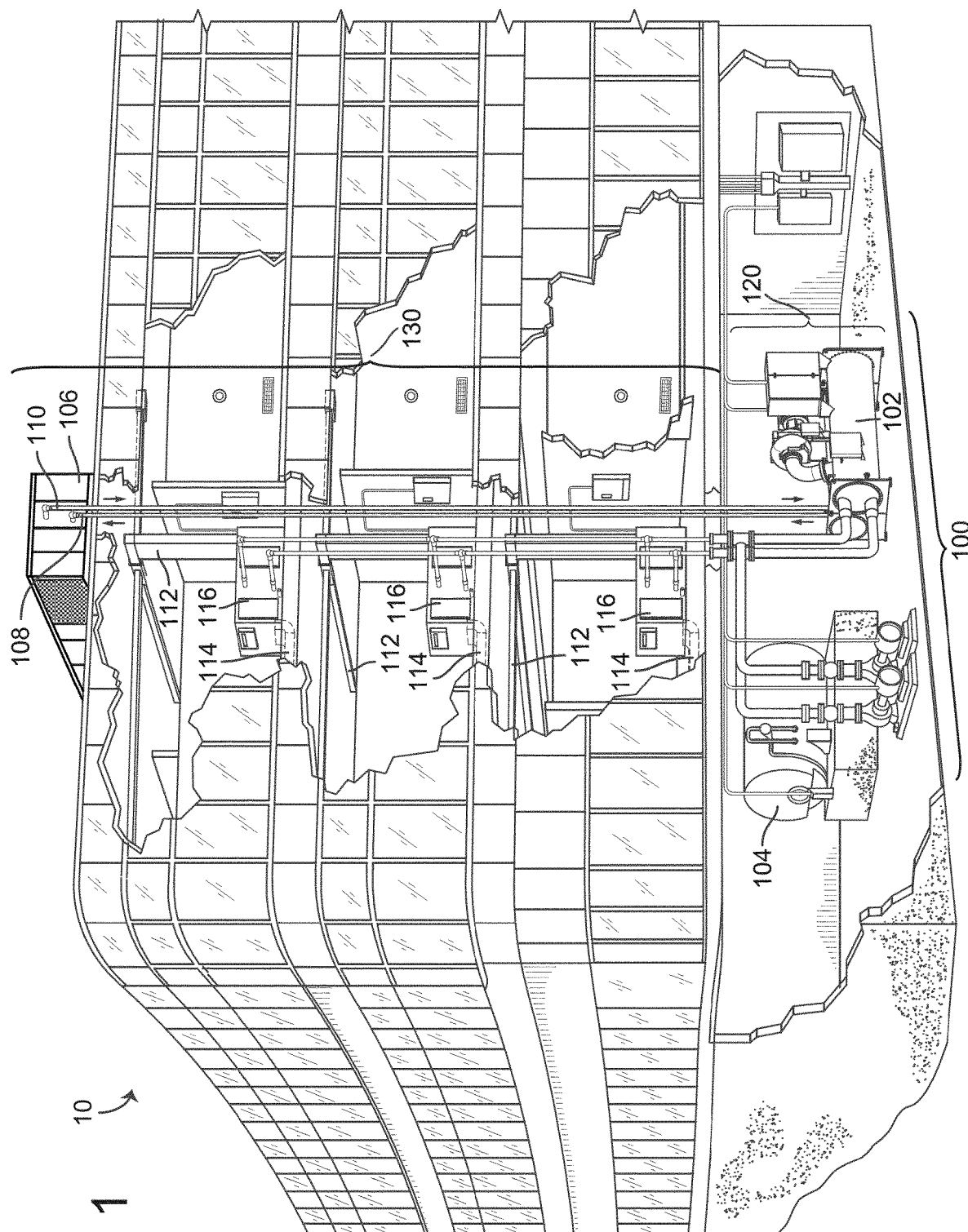
FIG. 1 is a schematic drawing of a building equipped with an HVAC system, according to some embodiments.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.).

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Waterside System

Figure 2:
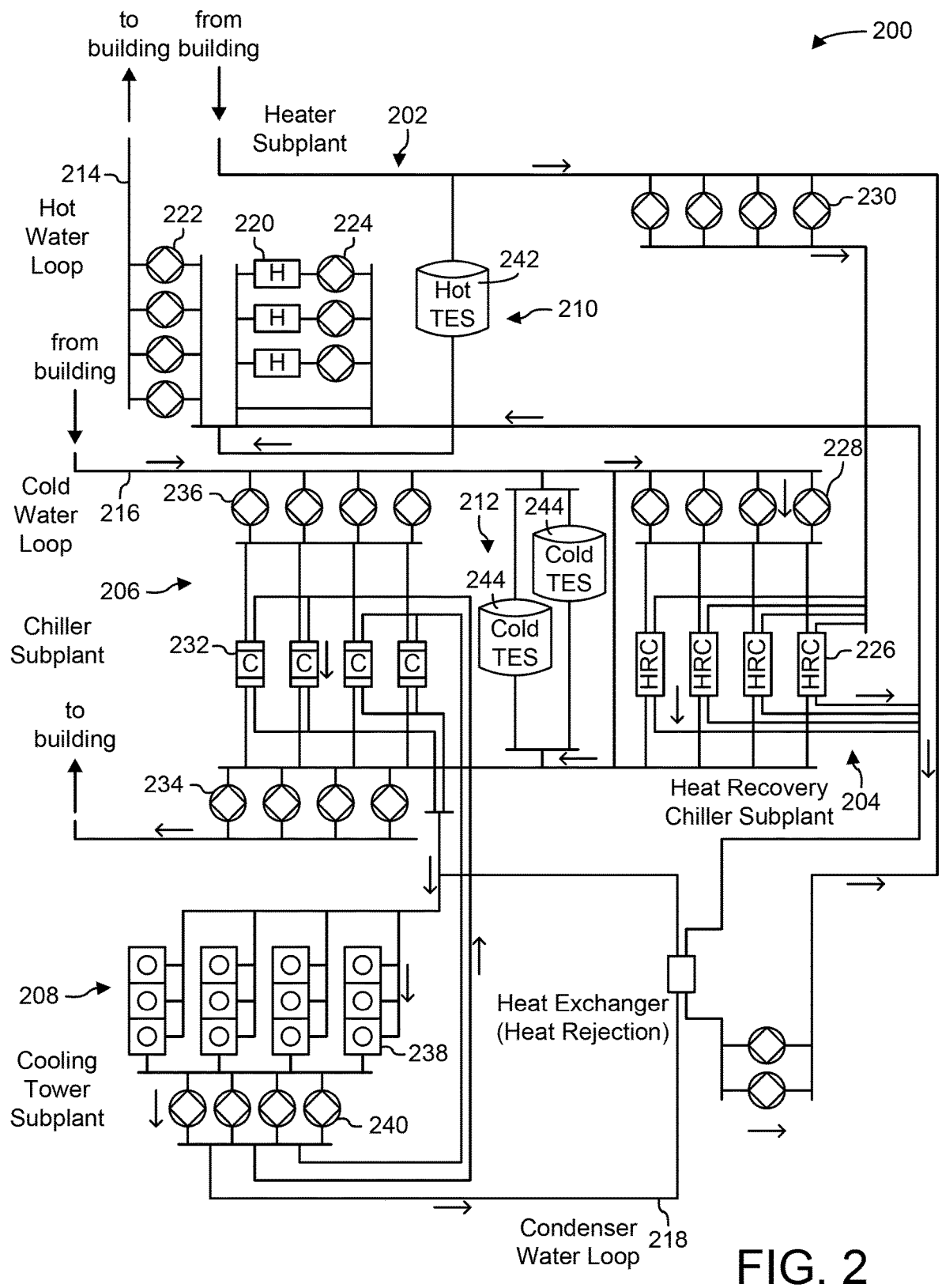
FIG. 2 is a schematic drawing of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
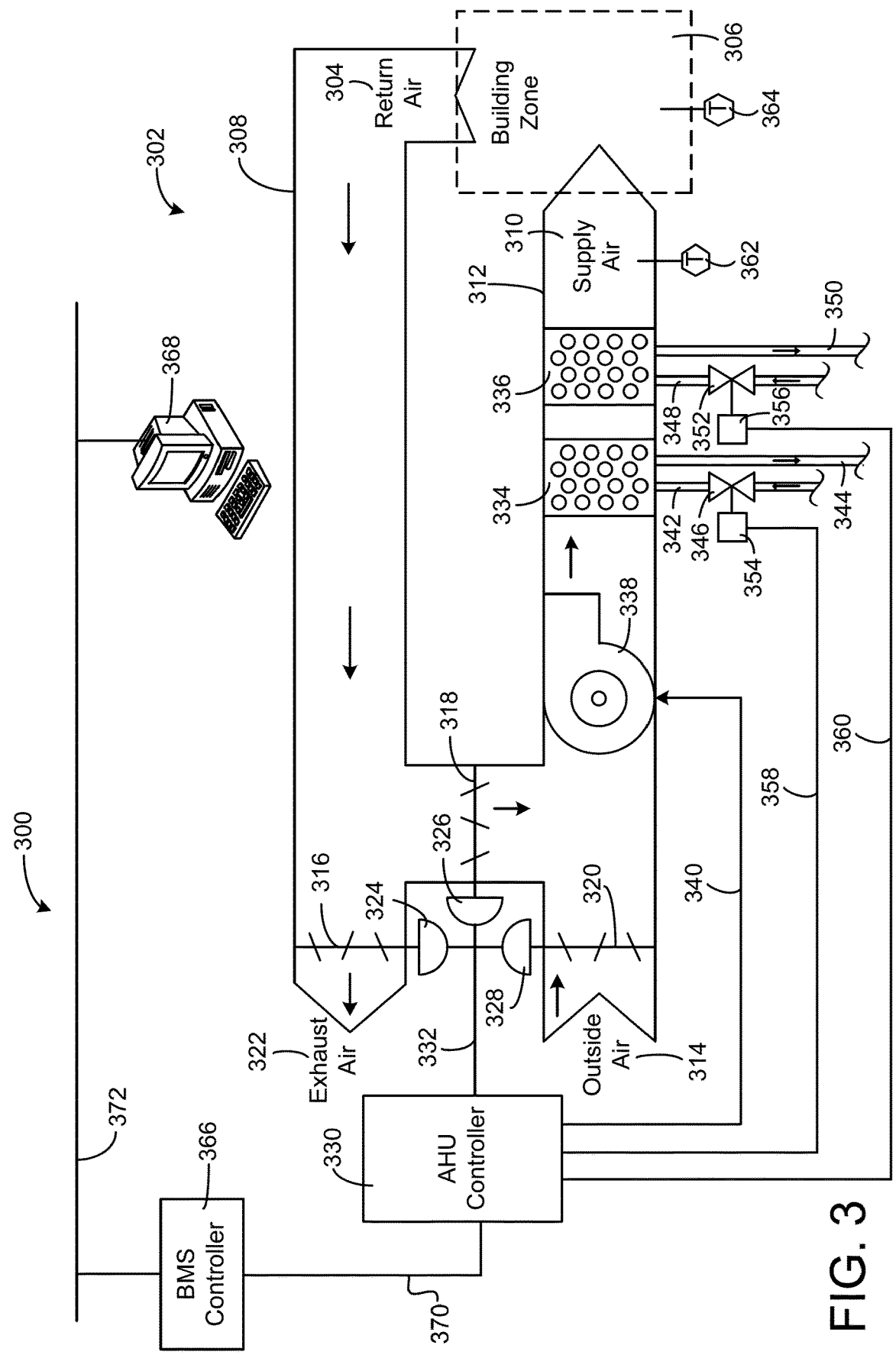
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flowrate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
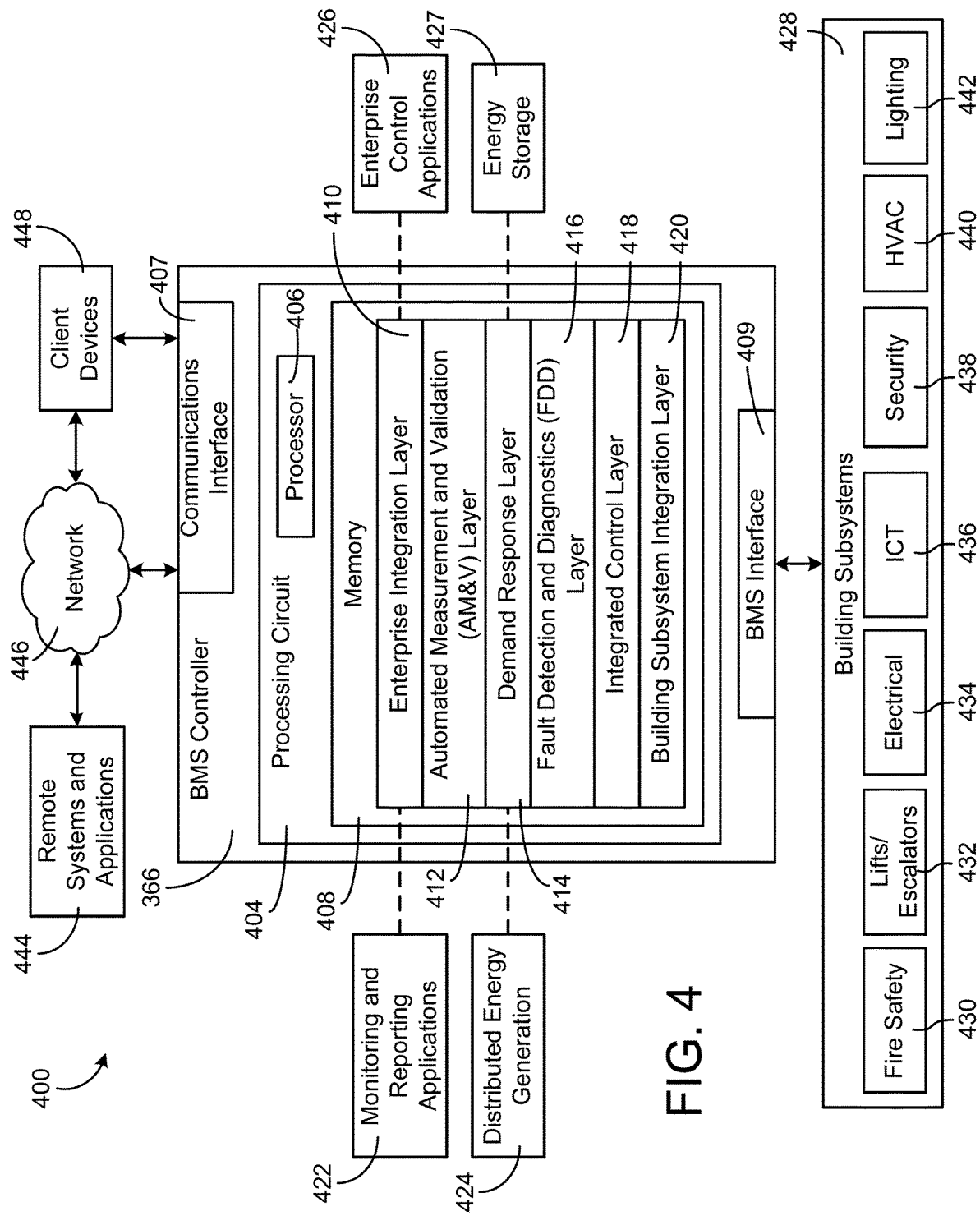
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application-specific integrated circuit (ASIC), one or more field-programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon di-oxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Cloud Server with BMS Data Overview

Figure 5:
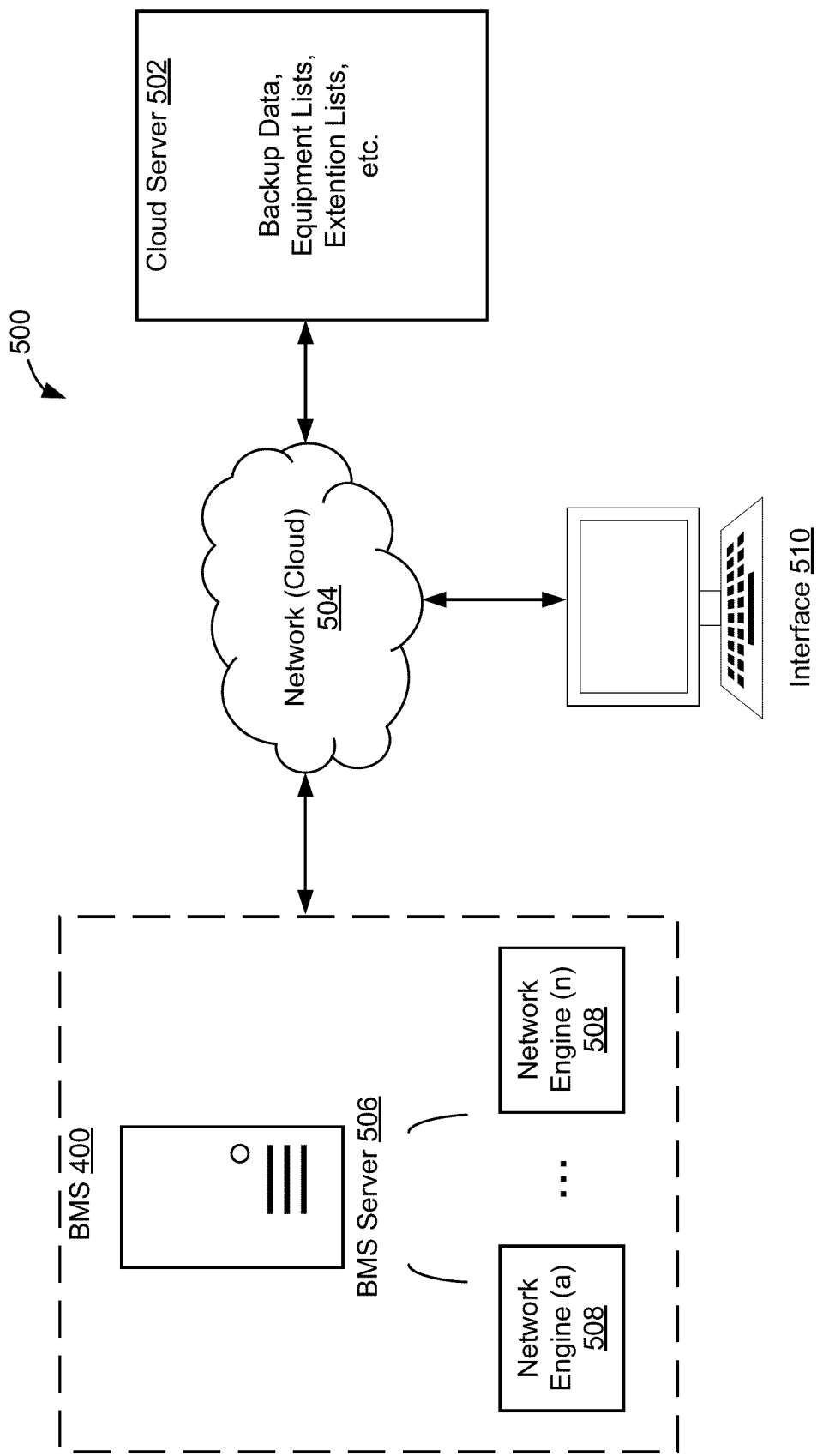
FIG. 5 is a block diagram of a data transfer system that may be communicably coupled with the BMS of FIG. 4, according to some embodiments.

Referring now to FIG. 5, a block diagram of system 500 is shown, according to some embodiments. System 500 is shown to include BMS 400, cloud server 502, network 504, and interface 510. In some embodiments, system 500 includes some or all of BMS 400 within building 10, as well as off-premise processing (e.g., cloud server 502) throughout which the various components communicate therewith over network 504. In some embodiments, system 500 facilitates the transmission and storage of BMS data within building 10 (e.g. and other buildings, etc.) to an off-premise location, and provides means for processing the BMS data to determine updates (e.g., changes, differences, new equipment, new subsystems, etc.).

Cloud server 502 may be any processing device located off-premise (e.g., within the cloud, etc.). For example, cloud server 502 is located in a data center in a difference region (e.g., different state) than building 10. Cloud server 502 can be or include any number of processing devices that are configured to retrieve, store, process, and analyze BMS from BMS 400 and/or other BMS systems from other buildings (not shown). Cloud server 502 is described in greater detail below with reference to FIG. 6.

Network 504 can communicatively couple the devices and systems of system 500. In some embodiments, network 504 is at least one of and/or a combination of a Wi-Fi network, a wired Ethernet network, a ZigBee network, a Bluetooth network, and/or any other wireless network. Network 504 may be a local area network or a wide area network (e.g., the Internet, a building WAN, etc.) and may use a variety of communications protocols (e.g., BACnet, BACnet/IP, BACnet/Ethernet, LON, etc.). Network 504 may include routers, modems, servers, cell towers, satellites, and/or network switches. Network 504 may be a combination of wired and wireless networks.

Interface 510 may be any type of interface configured to receive information (e.g., updates, notifications, messages, emails, etc.) from cloud server 502. In some embodiments, a building application is hosted on a user device (e.g., smartphone, tablet, workstation computer, etc.) and the application is configured to facilitate communication between the user (e.g., via touch input, messaging, etc.) and cloud server 502. Cloud server 502 may be configured to provide updates to interface 510 regarding changes between sets of BMS data that have been received at cloud server 502.

Figure 6:
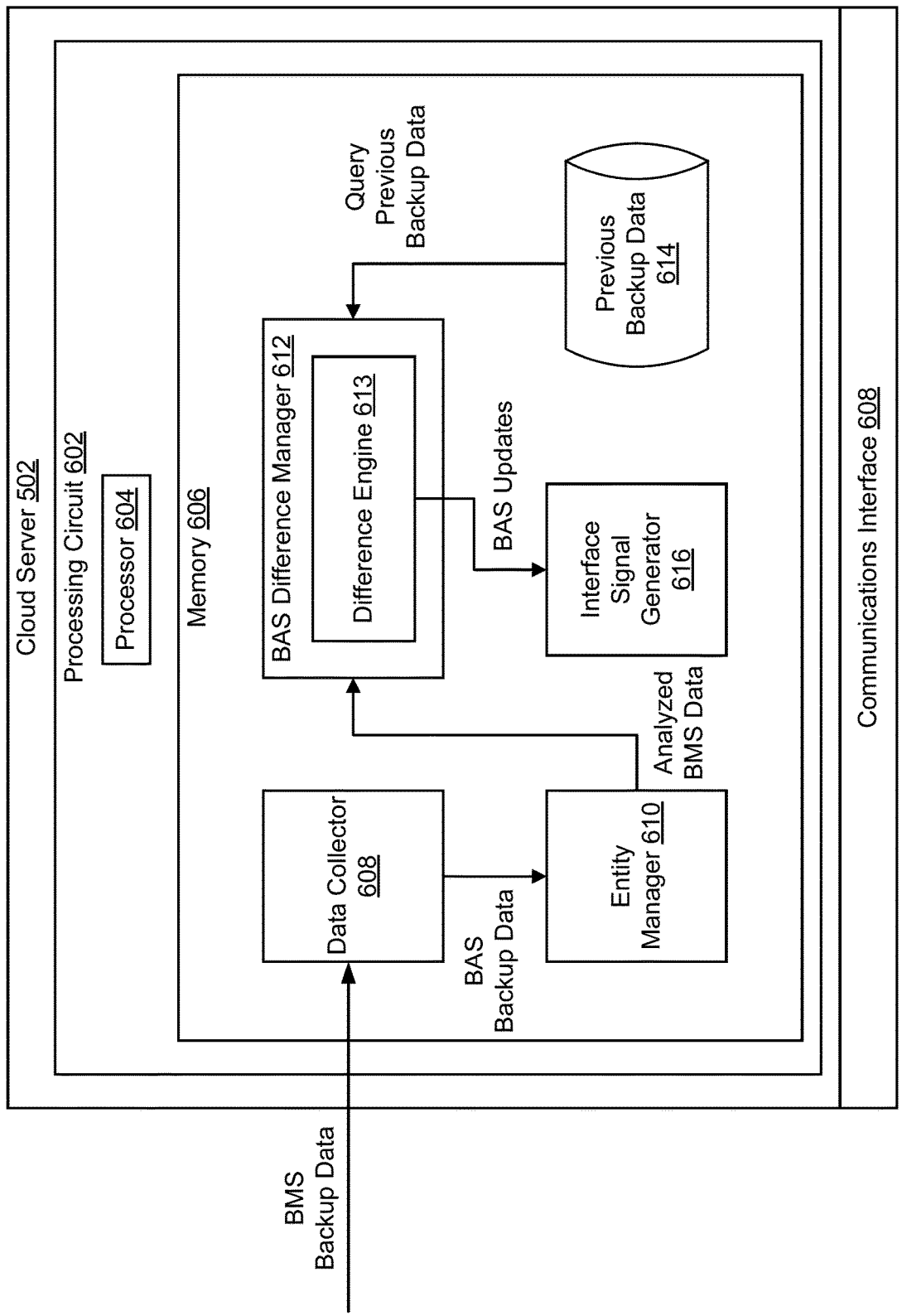
FIG. 6 is a block diagram of a cloud server, which may be implemented in the data transfer system of FIG. 5, according to some embodiments.

Referring now to FIG. 6, a detailed block diagram of cloud server 502 is shown, according to some embodiments. Cloud server 502 is shown to include processing circuit 602 including a processor 604 and memory 606. Processing circuit 602 can be communicably connected to communications interface 608 such that processing circuit 602 and the various components thereof can send and receive data via communications interface 608. Processor 604 can be implemented as a general purpose processor, an application-specific integrated circuit (ASIC), one or more field-programmable gate arrays (FPGAs), a group of processing components, or other suitable electronic processing components.

Memory 606 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 606 can be or include volatile memory or non-volatile memory. Memory 606 can include database components, object code components, script components, or any other type of information structure for supporting the various activities and information structures described in the present application. According to an exemplary embodiment, memory 408 is communicably connected to processor 604 via processing circuit 602 and includes computer code for executing (e.g., by processing circuit 404 and/or processor 606) one or more processes described herein.

In some embodiments, cloud server 502 is implemented within a single computer (e.g., one server, one housing, etc.). In various other embodiments cloud server 502 can be distributed across multiple servers or computers (e.g., that can exist in distributed locations, that can exist in the same datacenter, etc.). Memory 606 is shown to include data collector 609, entity manager 610, BMS difference manager 612 (including difference engine 613), previous backup data 614, and interface signal generator 616.

Data collector 609 may be configured to receive the BMS backup data from one or more of the servers, devices, and/or components located on premise (e.g., BMS server 506, network engine 508, (a)-(n), etc.). In some embodiments, data collector 609 can receive multiple types of data indicative of equipment and systems including the equipment. For example, data collector 609 can receive BACnet object data associated with damper 320, and, which may further indicate the other components upstream or downstream of damper 320 (e.g., fan 338, etc.). In some embodiments, cloud server 502 can be configured to parse the received BMS data to determine these relationships, and store these relationships in a database for future processing. This is described in greater detail below. Data collector 609 may be configured to provide the BMS (e.g., or BMS) data to entity manager 610.

Entity manager 610 may be configured to receive the BMS backup data in raw form, and perform processing to determine multiple "BMS data properties" associated with the data. In some embodiments, the equipment properties described herein include equipment lists, spaces lists, extension lists, or any combination thereof. In some embodiments, the data can also include the equipment name/type for which the data is associated therewith. For example, entity manager 610 may receive BMS data of airside system 300, and determine a list of all of the equipment, within airside system (e.g., based on BACnet object properties, etc.), a list of the spaces (e.g., zones, etc.) in which the equipment is located within, and a list of the extensions of the equipment, which may include the relationship/entity data associated with the equipment (e.g., the equipment upstream or downstream from the respective equipment, etc.). Entity manager may be configured to provide the analyzed BMS data to BMS difference manager 612.

BMS difference manager 612 may be configured to receive the analyze BMS data and previous sets of BMS backup data (e.g., from previous backup database 614, etc.) and determine differences (e.g., changes in equipment, deltas between operating data, etc.) between the data sets.

Interface signal generator 616 may be configured to receive the updates determined by BMS difference manage 612 and facilitate the transmission of the updates to one or more client devices communicably connected to BMS sever 502. For example, building technicians may have tablets communicably coupled with BMS server 502 (e.g., via network 504, etc.) that host an application which can communicate with cloud server 502. For example, the application hosted on a workstation within building 10 displays a notification on interface 510 that 10 new VAV boxes have been added to the airside system 300, as of the last BMS backup.

Referring generally to FIGS. 7A-B, a representation of what can be displayed on interface 510 is shown, according to some embodiments. In some embodiments, some or all of the icons shown within diagrams 700, 710 can be interacted with via a user (e.g., via a click, touch, etc.). For example, a user can select "view" of BMS backup for Jun. 3, 2021, to view a detailed summary of the BMS data that was provided at that time of receiving the BMS backup on June 3.

Referring specifically to FIG. 7A, a diagram 700 showing multiple representations of data sets that may have been parsed from the received backup BMS data, according to some embodiments. Diagram 700 is shown to include "Cloud Hosted Server User Interface" which may represent the information displayed on interface 510. The information includes multiple BMS backup data sets: including one set from Jun. 3, 2021, one set from May 3, 2021, one set from Apr. 3, 2021, and an initial backup set from Mar. 21, 2021. Each of these data sets may be have been parsed/organized (e.g., by entity manager 610, etc.) to categorize relationship information, equipment specifications (e.g., equipment type, etc.), entity information, and extension information.

FIG. 7A is further shown to include a "Select Backup to Restore" feature. In some embodiments, a user may select to restore the BMS system to a former BMS "instance" where the data for the former BMS instance is stored within cloud server 502. For example, a user observers that the BMS backup from Jun. 3, 2021 includes 144 VAV boxes, but the technician interacting with interface 510 only wants to have 140 VAV operable in BMS 400, as is the case according to the BMS data from May 3, 2021. The technician then selects "restore" proximate to BMS backup data for Jun. 3, 2021. Cloud server 502 then provides control signals back to BMS 400 to reconfigure BMS 400 such that it operates substantially similar or identical to how BMS 400 was operating when the BMS backup data for May 3, 2021 was received. This may result in making the 4 additional VAV boxes inoperable.

Referring now to FIG. 7B, diagram 710 is shown to include a "Notifications Sent" section. In some embodiments, a user may view emails that have been received and/or text messages that have been received, in regards to updates determined by difference engine 613. For example, a user receives an email indicating that 4 new VAV boxes have been added to BMS 400, which is shown in diagram 700 in FIG. 7A, and which may be determined by difference engine 613.

BMS Data Backup Processes

Figure 8:
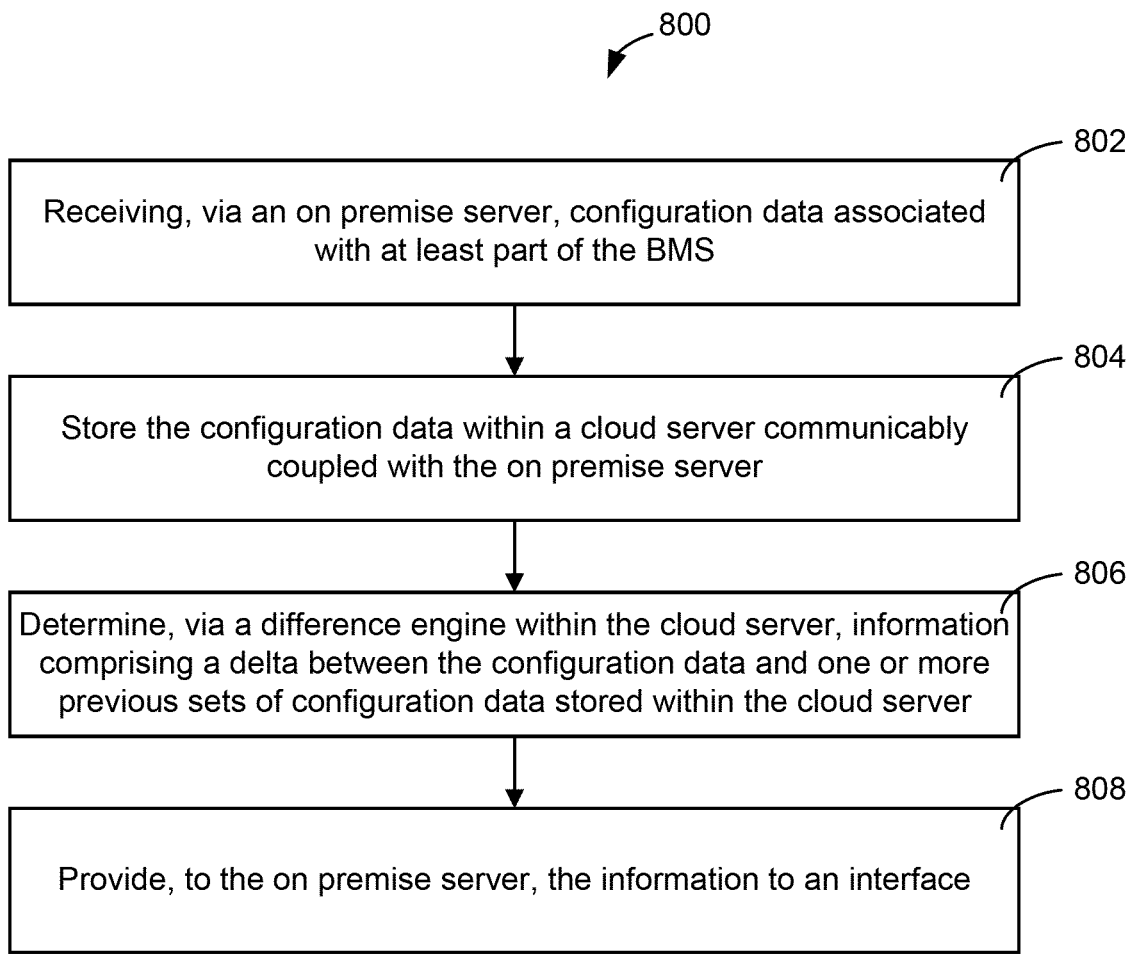
FIG. 8 is a flow diagram of a process for determining deltas between multiple BMS data sets, which can be performed by the cloud server of FIG. 6, according to some embodiments.

Referring now to FIG. 8, a flow diagram of a process 800 is shown, according to some embodiments. Process 800 may be performed by any of the processing components described herein. For example, process 800 can be performed by cloud server 502 as described above with reference to FIG. 6.

Process 800 is shown to include receiving, via an on premise server, configuration data associated with at least part of the BMS (step 802) and storing the configuration data within a cloud server communicably coupled with the on premise server (step 804). In some embodiments, cloud server 502 may store multiple configuration data sets representing operation of the BMS at different time periods. For example, BMS server 506, is configured (e.g., automatically, manually, etc.) to upload large amounts of BMS data to cloud server 502.

Process 800 is shown to include determining, via a difference engine within the cloud server, information including a delta between the configuration data and one or more previous sets of configuration data stored within the cloud server (step 806). In some embodiments, cloud server 502 can determine one or more equipment that have been added to the BMS. Further, cloud server 502 may be aware of energy costs associated with the equipment (e.g., via a priori knowledge queried from a database, by monitoring the equipment, etc.) and can perform processing to determine and increase/decrease of energy costs based on the new BMS data as compared to an older set of BMS data (e.g., the most recent data set, etc.). These updates can be provided to interface 510 such that one or more building technicians can be aware of changes to the BMS over time.

Process 800 is shown to include providing, to the on premise server, the information to an interface (step 808). Cloud server 502 may be communicably coupled with one or more devices within building 10 (e.g., workstations, tablets, etc.) and/or outside building 10 (e.g., smartphones of employees, etc.). As described above, a device including interface 510 may display information received from cloud server 502 regarding updates to BMS 400, which can be based on the received BMS backup data from BMS server 506.

While not shown, process 800, may also include receiving instructions from interface 510 to restore the BMS to a previous implementation (e.g., one of the BMS data stores previously uploaded to cloud server 502 at a previous time period, etc.) and providing control signals to the BMS such that the BMS operates in accordance with the only configuration data of the BMS.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for a building management system (BMS), the method comprising:
    receiving, over time via an on premise server, time-varying configuration data associated with at least part of the BMS;
    storing, within a cloud server communicable with the on premise server, at a plurality of times, current versions of the time-varying configuration data such that the cloud server stores a plurality of configuration data backups corresponding to the plurality of times;
    providing an interface comprising selectable options corresponding to the plurality of configuration data backups arranged in a chronological order of the plurality of times associated with the plurality of configuration data backups and further presenting a count of fault warnings associated with at least one of the plurality of configuration data backups;
    receiving, via the interface, instructions to restore the BMS to a selected backup of the plurality of configuration data backups; and
    affecting a condition within a building by operating building equipment of the BMS using the selected backup of the plurality of configuration data backups.

2. The method of claim 1, wherein providing the interface comprises:
    determining, based on the configuration data backups, one or more equipment that have been added to the BMS; and
    displaying, based on monitoring the one or more equipment added to the BMS, an increase in energy costs resulting from the one or more equipment being added to the BMS.

3. The method of claim 1, wherein affecting the condition within the building comprises operating the building equipment to affect a temperature, humidity, or airflow of the building served by the BMS.

4. The method of claim 1, comprising:
    categorizing the configuration data such that the configuration data is categorized at least partially into at least one of a list of spaces within the BMS or a list of extensions associated with the building equipment in the BMS; and
    providing the at least one of the list of spaces within the BMS or the list of extensions associated with the building equipment in the BMS on the interface, in response to a request received via the interface.

5. The method of claim 1, further comprising sending, to a user device, at least one of an email or a text message indicative of a delta between the configuration data and one of the configuration data backups.

6. One or more non-transitory computer readable media (CRM) storing program instructions relating to a building management system (BMS), wherein, when executed by one or more processors, the program instructions cause the one or more processors to:
    receive time-varying configuration data associated with at least part of the BMS;

store, within a cloud server communicable with the one or more processors, current versions of the time-varying configuration data at a plurality of times such that the cloud server stores a plurality of configuration data backups corresponding to the plurality of times;

provide an interface comprising selectable options corresponding to the plurality of configuration data backups arranged in a chronological order of the plurality of times associated with the plurality of configuration data backups and further presenting a count of fault warnings associated with at least one of the plurality of configuration data backups;

receiving, via the interface, instructions to restore the BMS to a selected backup of the plurality of configuration data backups; and affect a condition within a building by causing building equipment of the BMS using the selected backup of the plurality of configuration data backups.

7. The media of claim 6, wherein the program instructions cause the one or more processors to provide the interface by:
determining, based on the configuration data backups, one or more equipment that have been added to the BMS;
displaying, based on monitoring the one or more equipment added to the BMS, an increase in energy costs resulting from the one or more equipment being added to the BMS.

8. The media of claim 6, wherein the condition is a temperature, humidity, or airflow of a building served by the BMS.

9. The media of claim 6, wherein the program instructions cause the one or more processors to:
categorize the configuration data such that the configuration data is categorized at least partially into at least one of a list of equipment within the BMS and a list of spaces within the BMS; and
provide the at least one of the list of equipment within the BMS and the list of spaces within the BMS or a list of extensions associated with the bulding equipment in the BMS on the interface.

10. The media of claim 6, wherein the program instructions cause the one or more processors to provide the interface by including, in the interface, a number of objects within the BMS for at least one of the configuration data backups.

11. The media of claim 6, wherein the program instructions further cause the one or more processors to cause transmittal of at least one of an email or a text message indicative of a delta between the configuration data and one of configuration data backups.

12. A building platform for determining updates in a building management system (BMS) of the building, the building platform comprising a processing device comprising a processing circuit programmed to:
receive, via an on premise server, time-varying configuration data associated with at least part of the BMS;
store, within a cloud server communicable with one or more processors, current versions of the time-varying configuration data at a plurality of times such that the cloud server stores a plurality of configuration data backups corresponding to the plurality of times;
provide an interface comprising selectable options corresponding to the plurality of configuration data backups arranged in a chronological order of the plurality of times associated with the plurality of configuration data backups and further presenting a count of fault warnings associated with at least one of the plurality of configuration data backups;
receive, via the interface, instructions to restore the BMS to a selected backup of the plurality of configuration data backups; and
affect a condition within a building by controlling cause building equipment of the BMS using the selected backup of the plurality of configuration data backups.

13. The building platform of claim 12, wherein the processing circuit is programed to provide the interface by:
determining, based on the configuration data backups, one or more equipment that have been added to the BMS;
including in the interface, based on monitoring the one or more equipment added to the BMS, an increase in energy costs resulting from the one or more equipment being added to the BMS.

14. The building platform of claim 12, wherein the processing circuit is programmed to provide the interface by:
categorizing the configuration data such that the configuration data is categorized at least partially into at least one of a list of equipment within the BMS or a list of spaces within the BMS or a list of extensions associated with the building equipment in the BMS; and
providing the at least one of the list of equipment within the BMS or the list of spaces within the BMS or the list of extensions associated with the building equipment in the BMS to the interface, in response to a request received via the interface.

15. The building platform of claim 12, wherein the processing circuit is programed to cause transmittal of at least one of an email or a text message indicative of a delta between the configuration data and one of the configuration data backups.

* * * * *